US 8,844,128 B2

(12) United States Patent
Lim et al.

(10) Patent No.: US 8,844,128 B2
(45) Date of Patent: Sep. 30, 2014

(54) METHOD FOR MANUFACTURING ELECTROPHORETIC DISPLAY DEVICE

(75) Inventors: Yu Sok Lim, Seoul (KR); Myoung Ho Lee, Seoul (KR); Young Mu Oh, Seoul (KR); Seung Han Paek, Gyeonggi-do (KR); Young Jun Yu, Seoul (KR); Sung Jin Park, Geongsangbuk-do (KR); Seung-Hee Kang, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 24 days.

(21) Appl. No.: 13/227,636

(22) Filed: Sep. 8, 2011

(65) Prior Publication Data

US 2012/0073116 A1    Mar. 29, 2012

(30) Foreign Application Priority Data

Sep. 24, 2010 (KR) .......... 10-2010-0092795
Jun. 20, 2011 (KR) .......... 10-2011-0059611
Jun. 20, 2011 (KR) .......... 10-2011-0059621

(51) Int. Cl.
*H01B 19/00* (2006.01)
*G02F 1/167* (2006.01)

(52) U.S. Cl.
CPC ........ *G02F 1/167* (2013.01); *G02F 2001/1672* (2013.01)
USPC ............ 29/886; 29/592.1; 29/841; 345/105; 345/107; 359/290; 359/296

(58) Field of Classification Search
USPC .............. 29/592.1, 841, 886; 345/105, 107; 359/290, 296
See application file for complete search history.

(56) References Cited

U.S. PATENT DOCUMENTS

| 6,545,797 | B2 * | 4/2003  | Chen et al.    | 359/296 |
| 6,639,580 | B1 * | 10/2003 | Kishi et al.   | 345/107 |
| 6,930,818 | B1   | 8/2005  | Liang et al.   |         |
| 7,227,525 | B2 * | 6/2007  | Kishi          | 345/107 |
| 7,248,394 | B2 * | 7/2007  | Ding et al.    | 359/296 |
| 7,374,634 | B2 * | 5/2008  | Wang et al.    | 156/277 |
| 7,564,615 | B2 * | 7/2009  | Ahn et al.     | 359/296 |
| 7,903,321 | B2 * | 3/2011  | Ahn et al.     | 359/296 |
| 8,054,288 | B2 * | 11/2011 | Sugita et al.  | 345/107 |
| 2006/0209010 | A1 * | 9/2006 | Ding et al.   | 345/107 |

(Continued)

FOREIGN PATENT DOCUMENTS

| CN | 1363056 A     | 8/2002  |
| JP | 2000-322007 A | 11/2000 |

(Continued)

OTHER PUBLICATIONS

Office Action from the Korean Patent Office dated Jan. 28, 2013 in counterpart application No. 10-2010-0092795.

(Continued)

*Primary Examiner* — Paul D Kim
(74) *Attorney, Agent, or Firm* — Morgan, Lewis & Bockius LLP

(57) ABSTRACT

A method for manufacturing an electrophoretic display device includes forming partition walls for defining a plurality of pixel regions on a lower substrate; filling charged particles into the plurality of pixel regions; filling a pixel solvent in the plurality of pixel regions having been filled with the charged particles; and attaching the lower substrate and an upper substrate to each other.

19 Claims, 9 Drawing Sheets

(56) References Cited

U.S. PATENT DOCUMENTS

| | | | |
|---|---|---|---|
| 2009/0208730 A1 | 8/2009 | Komatsu et al. | |
| 2009/0269703 A1* | 10/2009 | Ahn et al. | 430/312 |
| 2010/0134407 A1* | 6/2010 | Wang et al. | 345/107 |
| 2011/0085227 A1* | 4/2011 | Verschueren et al. | 359/296 |
| 2011/0141550 A1* | 6/2011 | Ishida | 359/296 |
| 2012/0293859 A1* | 11/2012 | Ikegami et al. | 359/296 |

FOREIGN PATENT DOCUMENTS

| | | |
|---|---|---|
| JP | 2004-062040 A | 2/2004 |
| KR | 1020070016139 A | 2/2007 |
| TW | I306976 | 9/2001 |
| TW | 200632498 A | 3/2005 |

OTHER PUBLICATIONS

Office Action from the Korean Patent Office dated Jul. 3, 2013 in counterpart application No. 10-2010-0092795.

First Office Action dated Feb. 20, 2014 from the Taiwan Advance Patent & Trademark Office in counterpart application No. 100134468.

Second Notification of Office Action dated Jul. 7, 2014 from The State Intellectual Property Office of China in Chinese counterpart application No. 201110281701.3.

* cited by examiner

METHOD FOR MANUFACTURING ELECTROPHORETIC DISPLAY DEVICE

CROSS REFERENCE TO RELATED APPLICATIONS

This application claims the benefit of the Korean Patent Application No. 10-2010-0092795 filed on Sep. 24, 2010, Korean Patent Application No. 10-2011-0059611 filed on Jun. 20, 2011, and Korean Patent Application No. 10-2011-0059621 filed on Jun. 20, 2011, all of which are hereby incorporated by reference as if fully set forth herein.

BACKGROUND OF THE INVENTION

1. Field of the Invention

The present invention relates to an electrophoretic display device, and more particularly, to a method for manufacturing an electrophoretic display device that improves manufacturing efficiency and driving reliability.

2. Discussion of the Related Art

An electrophoretic display device is a display device for displaying images by the electrophoresist phenomenon where colored charged particles move by an externally-applied electric field. In accordance with the electrophoresist phenomenon, when the electric field is applied to electrophoretic dispersion liquid (e-ink) obtained by dispersing charged particles in liquid, the charged particles move in the liquid by the Coulomb force.

Due to bistability of the electrophoretic display device, even though the applied voltage is removed from the electrophoretic display device, the displayed image is maintained for a long time. That is, even though there is no continuous supply of the voltage to the electrophoretic display device, the displayed image can be maintained for a long time. In this respect, the electrophoretic display device is especially appropriate for the electronic book (e-book) which does not require a rapid image stream.

Unlike a liquid crystal display device, the electrophoretic display device has no dependence on viewing angle. In addition, the electrophoretic display device can provide images having sufficient quality to make a user feel comfortable without eye strain. That is, the electrophoretic display device provides paper-like viewing comfort. Furthermore, a demand for the electrophoretic display device is gradually increased due to advantages of flexibility, low-power consumption, and eco-friendly properties.

FIG. 1 is a cross section view illustrating a related art electrophoretic display device.

With reference to FIG. 1, the related art electrophoretic display device includes lower and upper substrates 10 and 20 which are bonded to each facing each other, and an electrophoretic film 30 interposed between the lower and upper substrates 10 and 20. On the lower substrate 10, there are a plurality of pixel electrodes (not shown) which face with a common electrode 22 on the upper substrate 20, and a plurality of thin film transistors (TFTs, not shown) which serve as switching elements to apply a voltage to the plurality of pixel electrodes. The electrophoretic film 30 includes a plurality of microcapsules 32 comprising charged particles and solvent, and an adhesive layer 34 (or passivation layer) for protecting the microcapsules 32 and providing adhesion with the lower substrate 10. Upper substrate 20, the common electrode 22, and the electrophoretic film 30 may be integrated as one body. The microcapsule 32 includes positive (+) charged particles, negative (−) charged particles, and a solvent covering and protecting the charged particles. When an electric field is formed between the pixel electrode of the lower substrate 10 and the common electrode 22 of the upper substrate 20, the charged particles included in the microcapsule 32 move by electrophoresis, thereby displaying images.

For manufacturing the related art electrophoretic display device, the lower substrate 10, upper substrate 20, and lamination electrophoretic film 30 are separately manufactured. Then, the electrophoretic film 30 is interposed between the lower and upper substrates 10 and 20.

As the electrophoretic film 30 is maintained and transported while being provided with a release film (not shown) adhered to the passivation layer 34, the release film must be released from the electrophoretic film 30 just before laminating the electrophoretic film 30 on the lower substrate 10. After that, the passivation film 34 is adhered to the upper substrate 20 by the laminating process.

The respective processes for individually manufacturing the lower substrate 10, upper substrate 20, and electrophoretic film 30 may cause the complexity and the increase of manufacturing time, thereby deteriorating the efficiency. Also, the individually-manufactured electrophoretic film 30 has to be interposed by the additional process, thereby resulting in the increased manufacturing cost.

To overcome these problems, the electrophoretic film may be provided inside the lower substrate 10. However, the solvent may volatilize due to filling time of the electrophoretic dispersion liquid comprising the charged particles and solvent and waiting time of the process for bonding the lower and upper substrates to each other. As the solvent volatilizes due to the filling time of the electrophoretic dispersion liquid comprising the charged particles and solvent, and the waiting time of the process for bonding the lower and upper substrates to each other, the charged particles are not driven normally.

When trying to display full-color images by the electrophoretic display device, the charged particles colored in the specific color overflow into the neighboring pixel with the other-colored charged particles so that the color images are not properly displayed. Especially, if the pixels are filled with the electrophoretic dispersion liquid while being classified in respective colors to realize full-color images, the initially-filled electrophoretic dispersion liquid is different in degree of volatilization from the terminally-filled electrophoretic dispersion liquid. Accordingly, the respective pixels have different driving efficiencies due to the difference in degree of volatilization.

As a result, the pixels are driven abnormally so that the picture quality is deteriorated. If a large amount of the solvent in the electrophoretic dispersion liquid is volatilized, it is impossible to drive the corresponding pixel. Due to the above problems, the picture quality of the electrophoretic display device is deteriorated, thereby resulting in the deteriorated efficiency and reliability.

SUMMARY OF THE INVENTION

Accordingly, the present invention is directed to a method for manufacturing an electrophoretic display device that substantially obviates one or more problems due to limitations and disadvantages of the related art.

An object of the present invention is to provide a method for manufacturing an electrophoretic display device that improves manufacturing efficiency.

Another object of the present invention is to provide a method for manufacturing an electrophoretic display device to improve yield and driving reliability.

Another object of the present invention is to provide a method for manufacturing an electrophoretic display device with improved picture quality.

Another object of the present invention is to provide a method for manufacturing an electrophoretic display device to realize good picture quality with various colors.

Another object of the present invention is to provide a method for manufacturing an electrophoretic display device to overcome a problem related with a volatilization of electrophoretic dispersion liquid for a process of providing an electrophoretic dispersion liquid inside a lower substrate.

Another object of the present invention is to provide a method for manufacturing an electrophoretic display device to prevent non-filling area or over-filling area of electrophoretic dispersion liquid for a process of providing an electrophoretic dispersion liquid inside a lower substrate.

Another object of the present invention is to provide a method for manufacturing an electrophoretic display device to shorten filling time of electrophoretic dispersion liquid for a process of providing an electrophoretic dispersion liquid inside a lower substrate.

Another object of the present invention is to provide a method for manufacturing an electrophoretic display device to prevent contamination caused by an electrophoretic dispersion liquid overflowing a partition wall for a process of providing an electrophoretic dispersion liquid inside a lower substrate.

Additional features and advantages of the invention will be set forth in the description which follows, and in part will become apparent from the description, or may be learned by practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for manufacturing an electrophoretic display device includes forming partition walls for defining a plurality of pixel regions on a lower substrate; filling charged particles into the plurality of pixel regions; filling a pixel solvent in the plurality of pixel regions having been filled with the charged particles; and attaching the lower substrate and an upper substrate to each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. Hereinafter, an electrophoretic display device according to the present invention and a method for manufacturing the same will be described with reference to the accompanying drawings. For the following description of the embodiments of the present invention, if a first structure is formed "on or above" or "under or below" a second structure, the first and second structures may come in contact with each other, or there may be a third structure interposed between the first and second structures.

According to one aspect of the present invention, a method for manufacturing an electrophoretic display device is provided in which an electrophoretic dispersion liquid comprising charged particles and solvent is included inside a lower substrate. A technical spirit or scope of the present invention may be applied to all types of electrophoretic display devices regardless of the color of image to be realized, that is, monocolored image or full-colored image. Hereinafter, for convenience of explanation, an exemplarily color-type electrophoretic display device will be described as follows.

Figure 1:
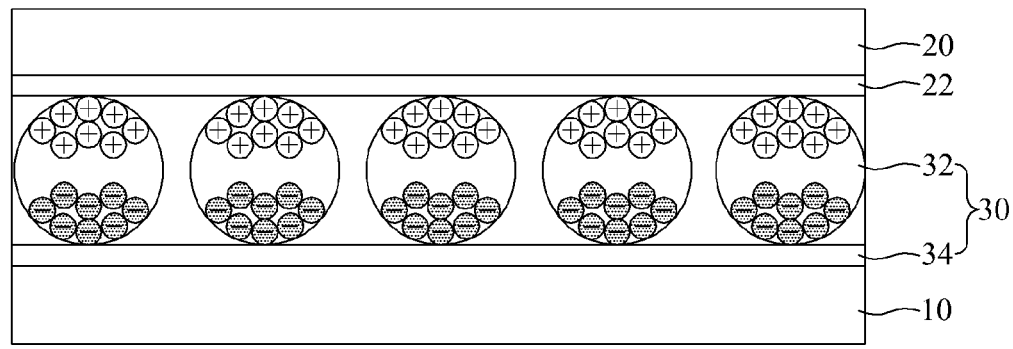
FIG. 1 illustrates a related art electrophoretic display device with a micro-cup type.
Figure 2:
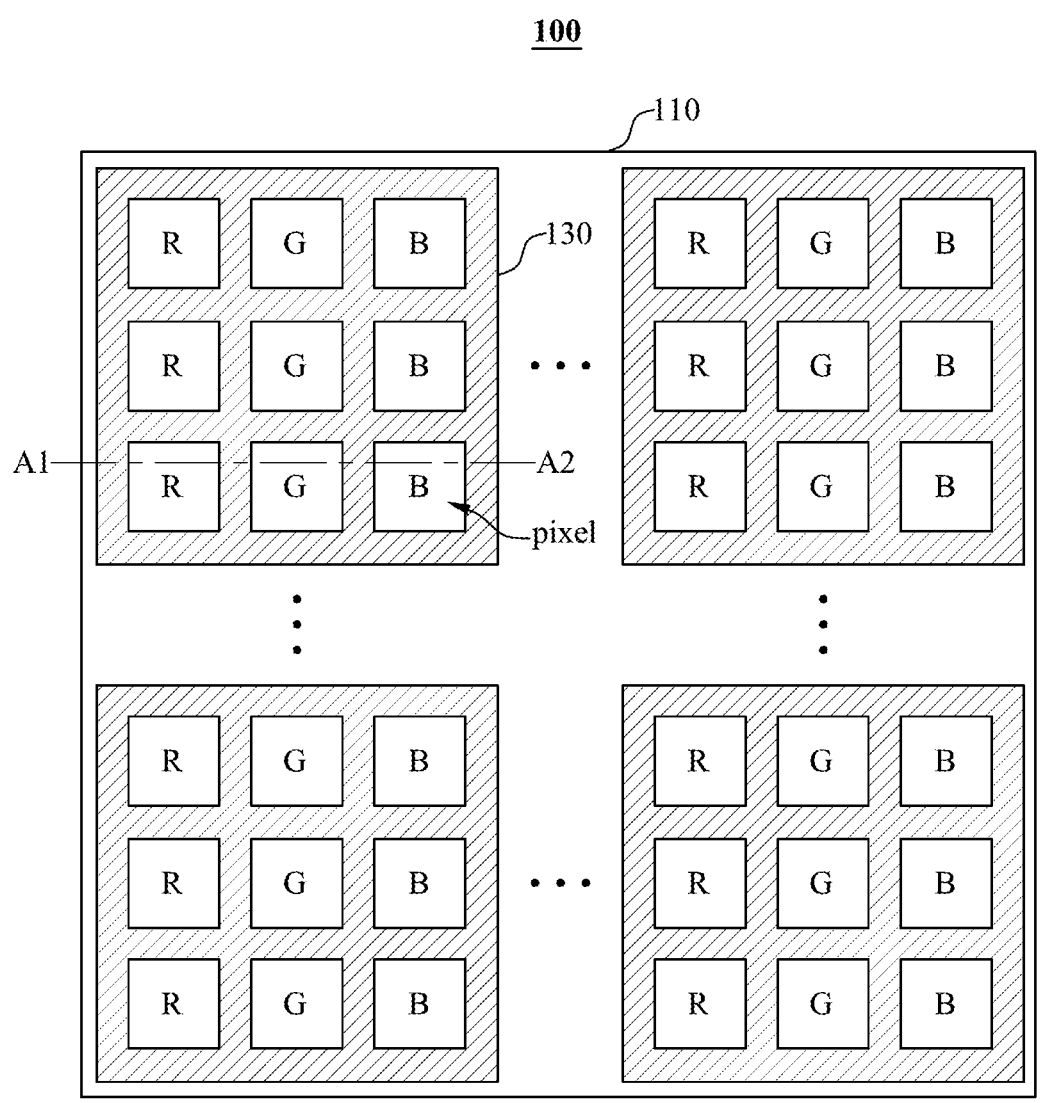
FIG. 2 illustrates an electrophoretic display device manufactured by an exemplary method according to the present invention.

FIG. 2 illustrates an electrophoretic display device manufactured by an exemplary method of the present invention. With reference to FIG. 2, the exemplary method may be applied not only to a method for manufacturing a mono-type electrophoretic display device, but also to a method for manufacturing an electrophoretic display device displaying a full-color image by red-colored, blue-colored, and green-colored charged particles in electrophoretic dispersion liquid (electrophoretic ink).

In FIG. 2, an electrophoretic display device displays a full-color image by red, green and blue pixels, but it is not limited to these color pixels. For example, the full-color image may be displayed by four to seven colored pixels with red-colored, blue-colored, green-colored, yellow-colored, cyan-colored, magenta-colored, black-colored, and white-colored charged particles. An exemplary process for forming an electrophoretic layer on a lower substrate 110 having a partition wall 130 will now be described in detail, but a detailed explanation for a process of manufacturing an upper substrate will be omitted. The upper substrate includes a base substrate, and a common electrode formed on the base substrate. The upper substrate should be transparent to display images. The base substrate included in the upper substrate may be formed of transparent glass or plastic. The common electrode is formed by coating a transparent conductive material, such as indium tin oxide (ITO) or indium zinc oxide (IZO), onto the base substrate of the upper substrate.

FIGS. 3 to 14 illustrate an exemplary method for manufacturing an electrophoretic display device according to the present invention. Hereinafter, a method for manufacturing the electrophoretic display device according to an exemplary embodiment will be described with reference to FIGS. 3 to 14.

Figure 3:
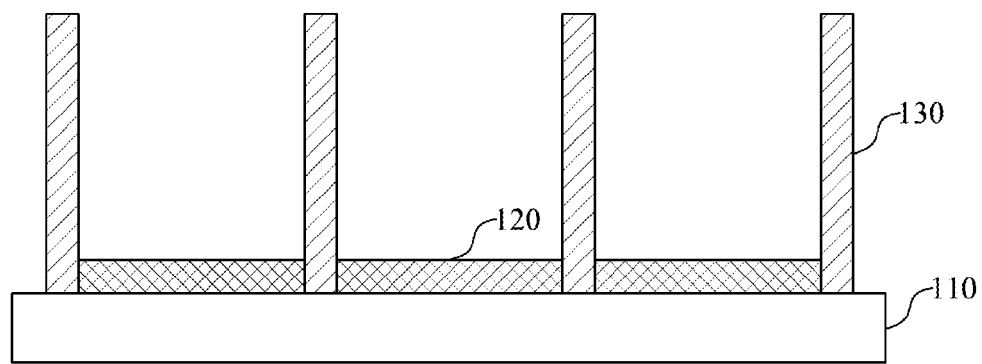
FIGS. 3 to 14 illustrate an exemplary method for manufacturing an electrophoretic display device according to the present invention.

With reference to FIG. 3, a conductive layer is formed by coating a conductive material, such as copper, aluminum or ITO, onto a base substrate 110 (or base film) including a plurality of thin film transistors (TFT) corresponding to a plurality of pixel regions. After that, the conductive layer is patterned by photolithography and by etching processes using photoresist (photoacryl), thereby forming a plurality of pixel electrodes 120 in the respective pixel regions.

At this time, the pixel electrode 120 may be formed by depositing nickel and/or aurum (Au) on the copper, aluminum, or ITO coating.

After that, an organic material is coated onto the base substrate 110 having the pixel electrode 120, and is then patterned, thereby forming a partition wall 130. The partition wall 130 surrounds the pixel electrode 120.

Figure 4:
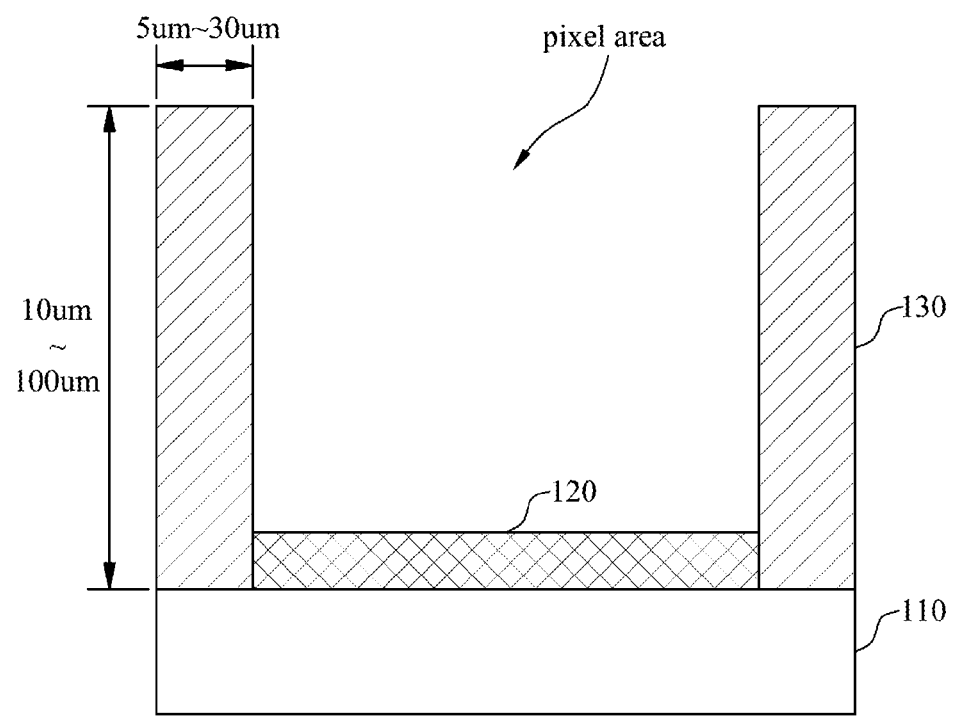

The pixel region (charge cell) to be filled with electrophoretic dispersion liquid is defined by the partition wall 130. At this time, as shown in FIG. 4, the partition wall 130 may have a height of 10 μm~100 μm, and a width of 5 μm~30 μm. Here, the partition wall 130 may be formed by an imprinting method or mold-printing method as well as the above photolithography.

The partition wall 130 contacts the electrophoretic dispersion liquid to be filled in the pixel region by the following manufacturing process. Thus, the partition wall 130 is formed of a non-polar organic material which is identical in property to that of the solvent of the electrophoretic dispersion liquid, thereby resulting in the smooth filling with the electrophoretic dispersion liquid. According to another exemplary embodiment of the present invention, the partition wall 130 may be formed of a non-polar inorganic material.

The base substrate (110, or base film) may be formed of a transparent glass substrate, a plastic substrate with flexibility, or a metal substrate. Since a lower substrate 100 is positioned at an opposite side to an image-displaying screen, it is unnecessary to provide the base substrate 100 of a transparent material.

Although not shown in FIGS. 2 and 3, a plurality of gate lines and data lines are formed on the base substrate 110. Adjacent to each crossing portion of the gate and data lines, there is the thin film transistor (TFT). The gate and data lines are formed in a single-layered structure of a low-resistivity material such as silver (Ag), aluminum (Al), or alloy thereof; or may be formed in a multi-layered structure obtained by adding a material layer with good electrical properties, for example, a material layer of chrome (Cr), titanium (Ti), or tantalum (Ta) to the aforementioned single layer.

The data line is connected with a source electrode of the thin film transistor, the gate line is connected with a gate electrode of the thin film transistor, and a drain electrode of the thin film transistor is electrically connected with the pixel electrode 102 via a contact hole. Each pixel is switched on/off by the thin film transistor. When the thin film transistor is turned on, a data voltage applied to the data line is supplied to the pixel electrode 120.

Figure 5:
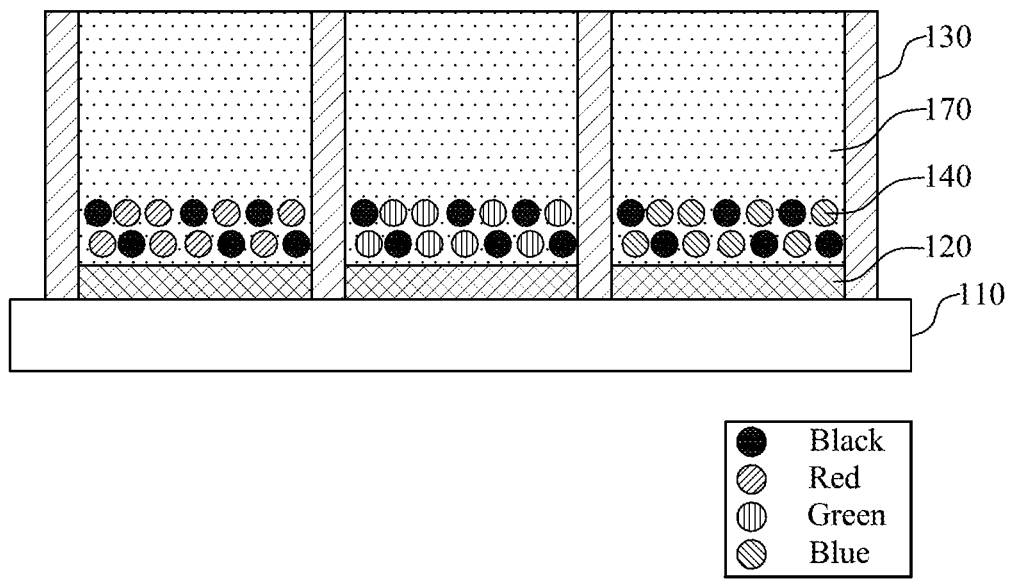

Then, as shown in FIG. 5, after forming the partition wall 130, the electrophoretic dispersion liquid is first filled into each of the entire pixel regions defined by the partition wall 130. The electrophoretic dispersion liquid filled in the pixel region may comprise the positive (+) or negative (-) charged particles 140 and filling solvent 170. Here, the filling solvent 170 is a first solvent used to fill the charged particles 140 into the pixel regions.

If the electrophoretic display device displays the full-colored image, the charged particles 140 are colored with the corresponding color to be displayed in each pixel. Thus, the above process for filling the electrophoretic dispersion liquid comprising the charged particles 140 and filling solvent 170 may be carried out sequentially in accordance with the respective colors of the charged particles 140. For example, if the plurality of pixels include the red, green, and blue colors, the electrophoretic dispersion liquid may be sequentially filled into the respective pixels according to the red, green, and blue colors.

Figure 6:
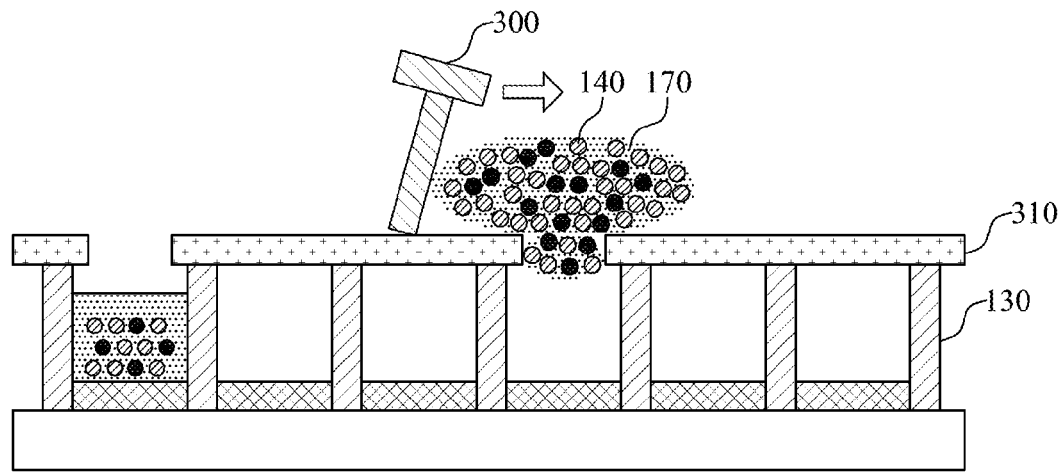
Figure 6:
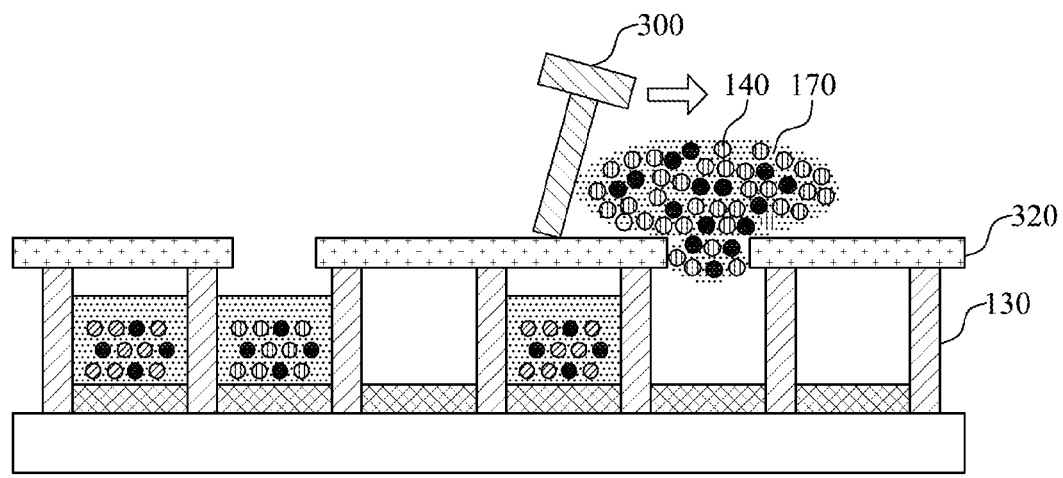
Figure 6:
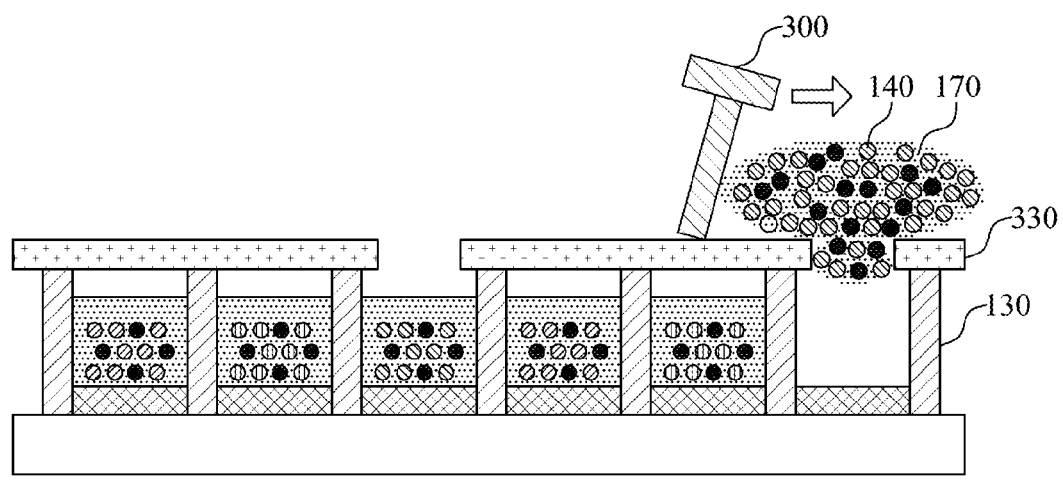

In more detail, as shown in FIG. 6, a first mask 310 for opening only red pixels among the entire pixels is aligned above the partition wall 130. Then, the red pixels are filled with electrophoretic dispersion liquid including the red-colored charged particles and the filling solvent 170 by a screen printing method using a squeeze bar 300.

Then, a second mask 320 for opening only green pixels among the entire pixels is aligned above the partition wall 130. Then, the green pixels are filled with electrophoretic dispersion liquid including the green-colored charged particles and the filling solvent 170 by a screen printing method using a squeeze bar 300.

Then, a third mask 330 for opening only blue pixels among the entire pixels is aligned above the partition wall 130. Then, the blue pixels are filled with electrophoretic dispersion liquid including the blue-colored charged particles and the filling solvent 170 by a screen printing method using a squeeze bar 300.

At this time, the first to third masks 310, 320, 330 may be formed of nickel, or may be formed the same material as that of the partition wall 130. According to another example, a mesh-type mask may be used.

In the electrophoretic dispersion liquid, a volume rate of the filling solvent 170 is about 10~30%; a volume rate of the charged particles 140 is about 70~90%; and a viscosity of the filling solvent 170 is about 100 cP~100 kcP. The first filling process of the electrophoretic dispersion liquid may be carried out under the condition of 5~50 [mm/sec] of squeeze speed and 0.1~30 [kgf] of squeeze pressure.

In the related art, the filling process of the electrophoretic dispersion liquid has limitations under the atmospheric pressure due to the rapid volatilization speed of the solvent. However, here the charged particles 140 may be filled into the pixel regions under the conditions of normal atmospheric pressure and normal temperature by the use of electrophoretic dispersion liquid having 100 cP~100 kcP of viscosity.

The electrophoretic dispersion liquid including the charged particles 140 and the filling solvent 170 is first filled into the red, green, and blue pixels in sequence.

FIGS. 5 and 6 illustrates that the black-colored charged particles together with the red-colored charged particles, the green-colored charged particles, and the blue-colored charged particles are filled into the red, green, and blue pixels, but not necessarily. Instead of the black-colored charged particles, the white-colored charged particles may be used. The first filling process of the electrophoretic dispersion liquid may use a die coating method, a casting method, a bar coating method, a slit coating method, a dispense method, a squeezing method, a screen-printing method, or an inkjet printing method as well as the above screen printing method.

The filling solvent 170 of the electrophoretic dispersion liquid may be a halogenated solvent, a saturated hydrocarbon, silicon oil, a low-molecular weight halogen-containing polymer, an epoxide, a vinylether, a vinylestr, an aromatic hydrocarbon, toluene, naphthalene, a paraffinic liquid, or a poly chlorotrifluoroethylene polymer. The filling solvent 170 is used only for filling the red-colored, green-colored, and blue-colored charged particles 140 into the charge cell of the pixel region. Selectively, the material of the filling solvent 170 may vary depending on the aforementioned filling method. At this time, the material without precipitation and dissolution, which is to be used for the filling solvent 170, may be used in consideration for the reactivity of charged particles according to the filling method. For the following process, the filling solvent 170 may be formed of a material with high volatility facilitating the decrease of volatilization time, and the complete volatilization.

For the above explanation, the first filling process of the electrophoretic dispersion liquid exemplary shows a case where the charged particles 140 are red-colored, green-colored, and blue-colored. In addition, the first filling process of the electrophoretic dispersion liquid explained with reference to FIG. 6 may be identically applied to the case where the charged particles 140 are mono (black/white)-colored, yellow-colored, cyan-colored, and magenta-colored.

Figure 7:
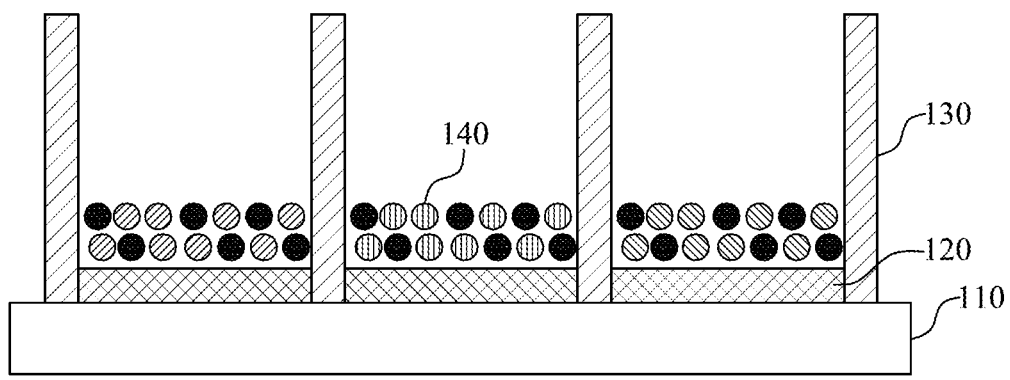

As shown in FIG. 7, the electrophoretic dispersion liquid including the charged particles 140 and the filling solvent 170 is first filled into the pixel region (charge cell), and then a drying process is carried out so that the filling solvent 170 is totally volatilized. For the first filling process of the electrophoretic dispersion liquid shown in FIG. 6, the filling solvent 170 may be volatilized partially or totally. After the electrophoretic dispersion liquid including the red-colored charged particles is filled into the red pixels, the filling solvent 170 is volatilized partially or totally. After that, the filling process of the green-colored charged particles may be carried out.

Also, after the electrophoretic dispersion liquid including the green-colored charged particles is filled into the green pixels, the filling solvent 170 is volatilized partially or totally. After that, the filling process of the blue-colored charged particles may be carried out.

If partially volatilizing the filling solvent 170, the filling solvent 170 filled into the red and green pixels may be volatilized for 10~30 minutes. If totally volatilizing the filling solvent 170, the filling solvent 170 in the entire pixel regions may be totally volatilized by the drying process for 1 minute~24 hours. For example, when a volume of the pixel region (charge cell) is $1.35 \times 10^{-4}$ cc, the drying process of the filling solvent 170 is carried out for 20 minutes or less.

For improving the drying efficiency, a temperature not more than 150° C. may be applied, thereby resulting in the increased speed of volatilizing the filling solvent 170. Also, it is possible to uniformly adjust the amount of filling solvent 170 volatilized in the entire pixel regions. This is only one example of the drying process. If there are the high volatility of the filling solvent 170 and the small volume of the pixel region, the drying process may be shortened more than the above.

Meanwhile, if the filling solvent 170 has a low volatility, and the pixel region has the large volume, the drying process may be increased more than the above. In consideration for the volatilization property of the filling solvent 170 and the volume of the pixel region, the drying time is determined appropriately to totally volatilize the filling solvent 170.

Figure 8:
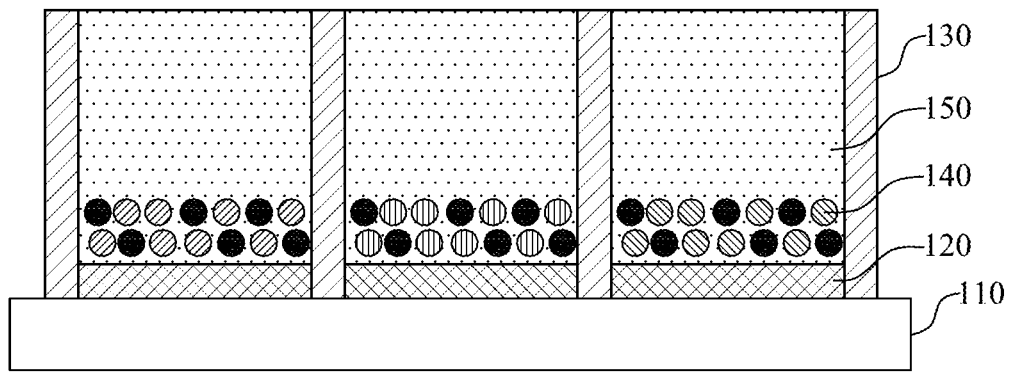

After totally volatilizing the filling solvent 170, as shown in FIG. 8, a pixel solvent 150, is simultaneously filled into the pixels of the entire pixel region wherein the charged particles 140 are already filled into the respective pixel regions. Here, the pixel solvent 150 is a second solvent that will remain the pixels of the completed electrophoretic display device.

At this time, the pixel solvent 150 having a viscosity of 1 cP~100 cP is filled into the pixel regions until coming to the upper end of the partition wall 130. After the pixel solvent 150 having a viscosity of 1 cP~100 cP is filled into the pixel region having the charged particles 140, the charged particles 140 may be driven by the electrophoresis. The pixel solvent 150 may be a halogenated solvent, a saturated hydrocarbon, silicon oil, a low-molecular weight halogen-containing polymer, an epoxide, a vinylether, a vinylester, an aromatic hydrocarbon, toluene, naphthalene, a paraffinic liquid, or a poly chlorotrifluoroethylene polymer. The pixel solvent 150 may be filled into the respective pixel regions (charge cell) by a die coating method, a casting method, a bar coating method, a slit coating method, a dispense method, a squeezing method, a screen-printing method, or an inkjet printing method. The filling amount of the pixel solvent 150 may be adjusted in consideration of the waiting time before bonding the lower and upper substrates.

Figure 9:
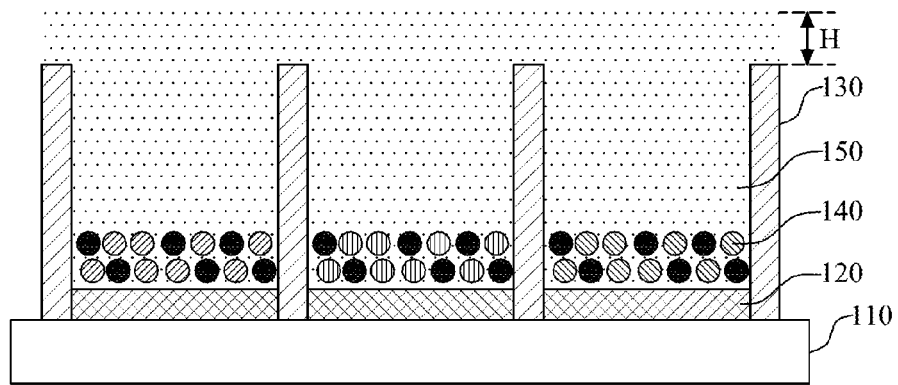

For example, as shown in FIG. 9, the filling amount of the pixel solvent 150 is relatively larger than the filling amount of the filling solvent 170. In consideration for the spontaneous volatilization amount of the pixel solvent 150 for the waiting time until the following process, the pixel solvent 150 is filled more from the upper end of the partition wall 130 to a predetermined height (H). It is unnecessary that the material of the pixel solvent 150 be the same as the material of the filling solvent 170. According to the filling method, the materials of the filling solvent 170 and the pixel solvent 150 may vary.

Figure 10:
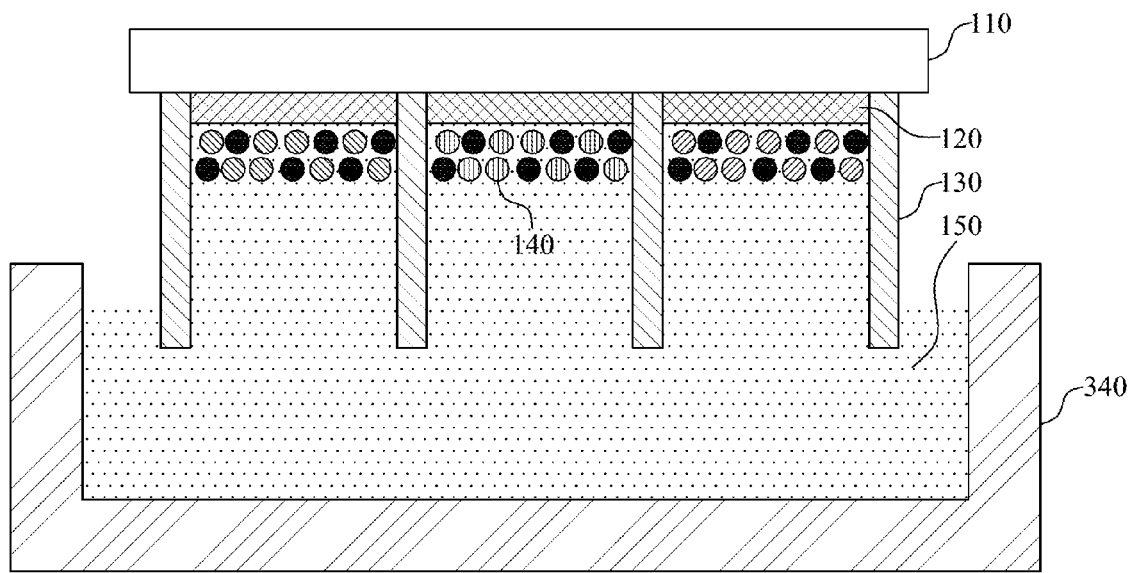

According to another example, after totally volatilizing the filling solvent 170, as shown in FIG. 10, the pixel solvent 150 may be simultaneously filled into the entire pixel regions. In more detail, after a container 340 is filled with the pixel solvent 150, the base substrate 110 on which the partition wall 130 is formed is reversed, and is then brought into contact with the pixel solvent 150. Thus, the charge cell space prepared by the partition wall 130 is filled with the pixel solvent 150 by a capillary phenomenon so that the entire pixel regions are simultaneously filled with the pixel solvent 150. At this time, the pixel solvent 150 has a viscosity of 1 cP~100 cP.

As shown in FIG. 10, after the pixel solvent 150 is filled to the upper end of the partition wall 130, the base substrate 10 is reversed again to prevent the overflow of the red-colored, green-colored, and blue-colored charged particles 140 into the neighboring pixels. The pixel region filled with the charged particles 140 is filled with the pixel solvent 150 having a viscosity of 1 cP~100 cP so that the charged particles 140 are driven by the electrophoresis.

Figure 11:
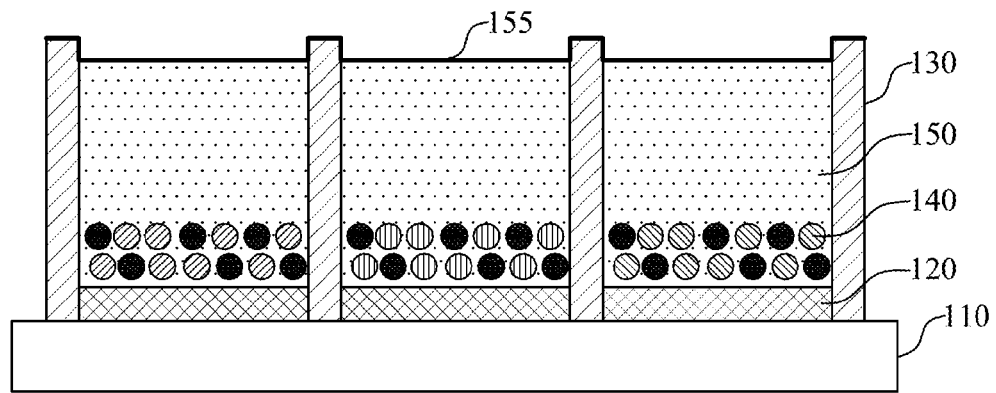

As shown in FIG. 11, the pixel solvent 150 is volatilized for a predetermined period determined in consideration for the waiting time until the following process, whereby the pixel region is filled with the appropriate amount of the pixel solvent 150 for the charged particles 140 to be driven. For example, the pixel solvent 150 is volatilized until the remaining amount of the pixel solvent 150 is about 80~100% of the upper end of the partition wall 130 or the height of the partition wall 130. After that, the upper part of the partition wall 130 and the pixel solvent 150 are sealed by the use of sealant 155. The sealant 155 prevents the pixel solvent 150 from being volatilized.

Figure 12:
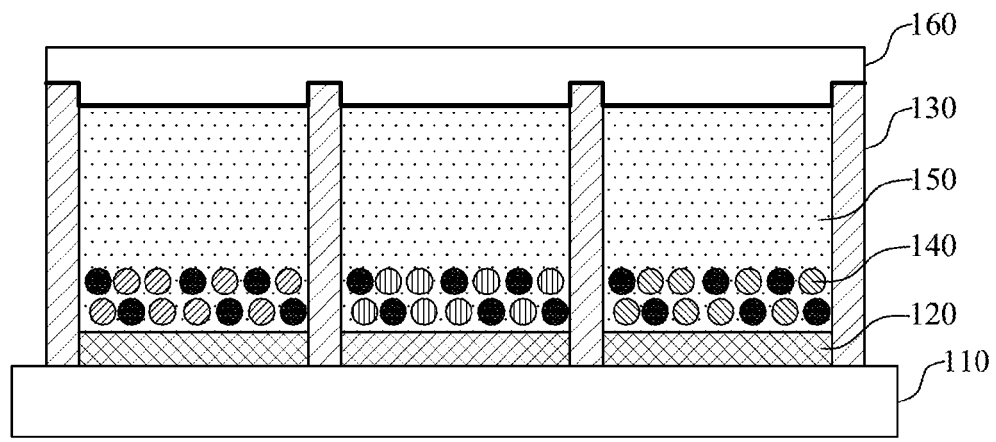

As shown in FIG. 12, an adhesive layer 160 (or sealing layer) is formed in the upper part of the pixel region filled with the electrophoretic dispersion liquid. The adhesive layer 160 is provided to bond the lower and upper substrates 100 and 200 to each other. Also, the sealant 155 together with the adhesive layer 160 may be additionally coated in the periphery of display area. At this time, the adhesive layer 160 bonds the lower and upper substrates 100 and 200 to each other, and also seals the electrophoretic dispersion liquid. The adhesive layer 160 may be formed by coating an adhesive material onto the partition wall 130 and the upper part of the pixel region filled with the electrophoretic dispersion liquid, and carrying out an imprinting process or photolithography process.

According to another example, the adhesive layer 160 may be formed by a roll-to-roll process using a roller with a predetermined pattern in relief or intaglio.

Figure 13:
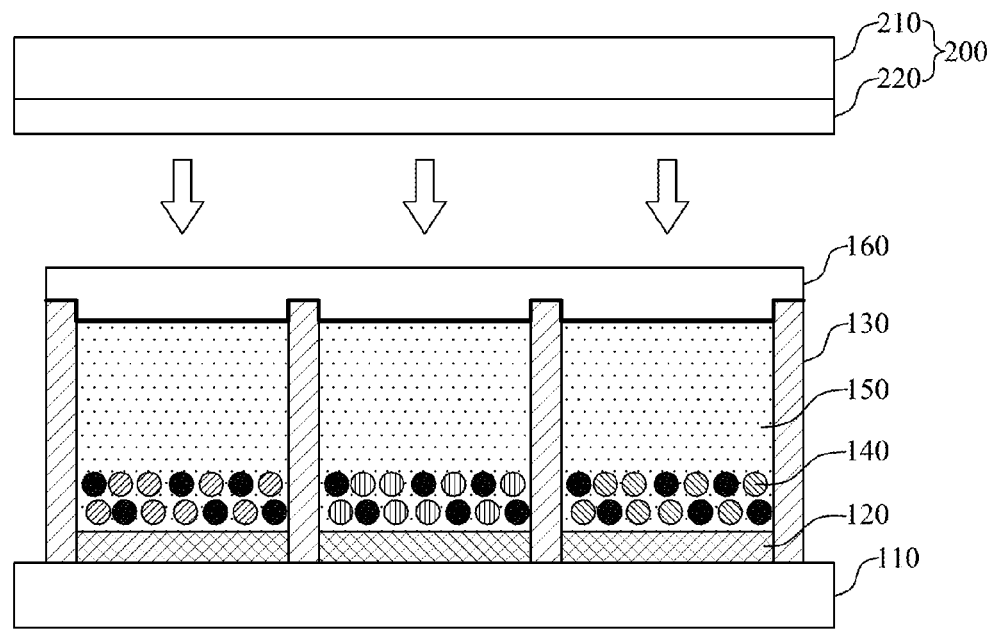

As shown in FIG. 13, the upper substrate 200 is manufactured by forming the common electrode 220 on the base substrate 210. In this case, the manufacturing process for the upper substrate 200 is separately carried out from the manufacturing process for the lower substrate 100. The lower and upper substrates 100 and 200 are first prepared by the respective manufacturing processes, and then are bonded to each other. The bonding process of the lower and upper substrates 100 and 200 is carried out by a pressurization process of applying a constant pressure, and an annealing process of applying a constant temperature. The lower and upper substrates 100 and 200 are bonded to each other by the use of adhesive layer 160, thereby completely shielding the display area.

Accordingly, the electrophoretic display device can be prevented from being contaminated by the external air and moisture, and the yield and reliability of the electrophoretic display device to be enhanced.

Meanwhile, after manufacturing the film-type adhesive layer 160, the lower and upper substrates 100 and 200 may be bonded by a lamination process.

Figure 14:
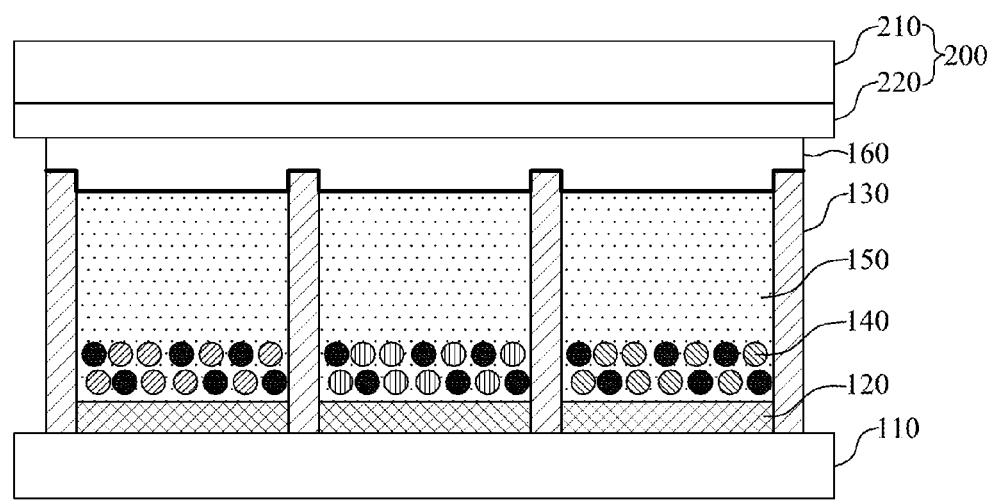

The above manufacturing process is carried out to manufacture the electrophoretic display device with the electrophoretic dispersion liquid provided in the lower substrate 100, as shown in FIG. 14.

As the charged particles 140 of the electrophoretic dispersion liquid filled into the pixel region move by an electric field formed by a data voltage applied to the plurality of pixel electrodes 120, and a common voltage applied to the common electrode 220 so that the mono-image and color-image are displayed on the electrophoretic display device manufactured by the present invention. For the above explanation, the adhesive layer 160 is formed on the lower substrate 100, but not necessarily.

According to another exemplary embodiment, the adhesive layer 160 may be formed on the upper substrate 200. That is, since the adhesive layer 160 is provided to bond the lower and upper substrates 100 and 200 to each other, the adhesive layer 160 may be formed on any one of the lower and upper substrates 100 and 200. If the adhesive layer 160 is formed on the upper surface 200, the adhesive layer 160 may be formed by coating the adhesive material is coated onto the common electrode 220, and carrying out the imprinting process, photolithography process, or roll-to-roll process.

The above method for manufacturing the electrophoretic display device prevents the non-filling area of the electrophoretic dispersion liquid for the process of providing the electrophoretic layer in the lower substrate, thereby resulting in the enhanced picture quality of the electrophoretic display device. Also, the method for manufacturing the electrophoretic display device secures the driving reliability of the display device. Also, the method for manufacturing the electrophoretic display device prevents the failure caused by the non-filling area of the electrophoretic dispersion liquid, thereby improving the yield and the manufacturing efficiency. Also, the method for manufacturing the electrophoretic display device provides the outer wall surrounding the electrophoretic dispersion liquid, that is, the partition wall whose properties are the same as those of the electrophoretic dispersion liquid, thereby resulting in a smooth filling process. Furthermore, the above method for manufacturing the electrophoretic display device advantageously applies the same infrastructure and equipment used in the related art method for manufacturing an LCD device. Accordingly, the method for manufacturing the electrophoretic display device enhances the yield of the electrophoretic display device. Also, the method for manufacturing the electrophoretic display device secures the driving reliability by the enhanced filling method of the electrophoretic dispersion liquid. Furthermore, the method for manufacturing the electrophoretic display device improves the picture quality of the electrophoretic display device by preventing the non-filling area and overfilling area of the electrophoretic dispersion liquid.

In the electrophoretic display device according to another exemplary embodiment, the electrophoretic dispersion liquid is provided in the lower substrate. This method for manufacturing the electrophoretic display device realizes a color image with the high picture quality. Also, this method for manufacturing the electrophoretic display device shortens the time consumed for the filling process of the electrophoretic dispersion liquid, and prevents the problem of the volatilization of the electrophoretic dispersion liquid.

The method for manufacturing the electrophoretic display device according to another exemplary embodiment prevents the overflow of the electrophoretic dispersion liquid into the partition wall for the process of providing the electrophoretic dispersion liquid in the lower substrate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing an electrophoretic display device, comprising:
    forming partition walls for defining a plurality of pixel regions on a lower substrate;
    filling charged particles into the plurality of pixel regions;
    after the filling charged particles, filling a pixel solvent into the plurality of pixel regions having been filled with the charged particles; and
    attaching the lower substrate and an upper substrate to each other,
    wherein the step of filling the charged particles into the plurality of pixel regions includes:
    filling the pixel regions with a filling solvent having the charged particles; and
    volatilizing the filling solvent.

2. The method according to claim 1, further comprising sealing an upper part of the partition walls and the pixel solvent.

3. The method according to claim 1, wherein the step of filling the charged particles into the plurality of pixel regions includes:
    filling charged red color particles;
    filling charged green color particles; and
    filling charged blue color particles.

4. The method according to claim 3, wherein the step of filling the charged particles into the plurality of pixel regions includes:
    partially or totally volatilizing the filling solvent after filling the filling solvent including red-colored charged particles into red pixels among the plurality of pixel regions;
    partially or totally volatilizing the filling solvent after filling the filling solvent including green-colored charged particles into green pixels among the plurality of pixel regions; and
    partially or totally volatilizing the filling solvent after filling the filling solvent including blue-colored charged particles into blue pixels among the plurality of pixel regions.

5. The method according to claim 1, wherein a viscosity of the filling solvent is larger than the viscosity of the pixel solvent.

6. The method according to claim 5, wherein the viscosity of the filling solvent is between 100 cP and 100 kcP.

7. The method according to claim 5, wherein the viscosity of the pixel solvent is between 1 cP and 100 cP.

8. The method according to claim 1, wherein the step of filling the pixel regions with the filling solvent having the charged particles includes filling with 10-30 percent by volume of solvent and 70-90 percent by volume of charged particles.

9. The method according to claim 1, wherein the filling solvent filled in the plurality of pixel regions is totally volatilized before filling the pixel solvent into the plurality of pixel regions.

10. The method according to claim 9, wherein the filling solvent is volatilized by applying a temperature less than 150° C.

11. The method according to claim 1, wherein the step of volatilizing the filling solvent is carried out for period between 1 minute and 24 hours.

12. The method according to claim 1, wherein the pixel solvent is simultaneously filled into the plurality of pixel regions after totally volatilizing the filling solvent.

13. The method according to claim 1, wherein the filling solvent and pixel solvent include one of a halogenated solvent, a saturated hydrocarbon, silicon oil, a low-molecular weight halogen-containing polymer, an epoxide, a vinylether, a vinylester, an aromatic hydrocarbon, toluene, naphthalene, a paraffinic liquid, or a poly chlorotrifluoroethylene polymer.

14. The method according to claim 1, wherein the filling solvent and pixel solvent include non-polar organic materials.

15. The method according to claim 1, wherein the charged particles include colored charged particles.

16. The method according to claim 1, wherein the step of filling the charged particles into the plurality of pixel regions includes a screen printing method using a mask which selectively opens a red pixel, a green pixel, and a blue pixel among the plurality of pixel regions under a squeeze speed of 5-50 mm/second and a squeeze pressure of 0.1-30 kgf.

17. The method according to claim 1, wherein the step of filling the pixel solvent into the plurality of pixel regions includes:
  inverting the lower substrate having the partition walls; and
  contacting the inverted lower substrate with pixel solvent so as to fill the plurality of pixel regions with the pixel solvent.

18. The method according to claim 1, wherein the step of filling the charged particles into the plurality of pixel regions and the step of filling the pixel solvent into the plurality of pixel regions are carried out by any one of a die coating method, a casting method, a bar coating method, a slit coating method, a dispense method, a squeezing method, a screen-printing method, and an inkjet printing method.

19. The method according to claim 1, wherein the partition walls have wall portions with a height of 10 μm-100 μm, and a width of 5 μm-30 μm.

* * * * *